United States Patent [19]

Rottinghaus

[11] Patent Number: 4,635,438
[45] Date of Patent: Jan. 13, 1987

[54] SELF-LOCKING LINK

[76] Inventor: Robert B. Rottinghaus, 4121 S. Canfield Rd., Canfield, Iowa 50648

[21] Appl. No.: 707,155

[22] Filed: Mar. 1, 1985

[51] Int. Cl.⁴ ............................................. F16G 13/06
[52] U.S. Cl. ............................................. 59/84; 59/85; 59/87
[58] Field of Search .................. 59/78, 84, 85, 86, 93, 59/87; 474/218

[56] References Cited

U.S. PATENT DOCUMENTS

| | | |
|---|---|---|
| Re. 21,093 | 5/1939 | Barnes . |
| 1,753,941 | 4/1930 | Reid et al. . |
| 1,980,126 | 11/1934 | Williams . |
| 2,052,066 | 8/1936 | Younie ................................... 59/85 |
| 2,079,384 | 5/1937 | Page . |
| 2,447,921 | 8/1948 | Thomas .................................. 59/86 |
| 2,972,223 | 2/1961 | Devonshire et al. . |
| 2,995,889 | 8/1961 | Johnson . |
| 3,139,720 | 7/1964 | Robbins . |
| 3,374,620 | 3/1968 | Gower . |
| 4,193,258 | 3/1980 | Fasnacht . |
| 4,220,052 | 9/1980 | Sheldon ................................. 59/84 |
| 4,272,952 | 6/1981 | Graham . |
| 4,400,932 | 8/1983 | Epstein . |
| 4,400,933 | 8/1983 | Fillmore et al. . |
| 4,408,450 | 10/1983 | Bernt . |

FOREIGN PATENT DOCUMENTS 2844616  4/1980  Fed. Rep. of Germany .......... 59/78

Primary Examiner—Lowell A. Larson
Assistant Examiner—David B. Jones
Attorney, Agent, or Firm—Emrich & Dithmar

[57] ABSTRACT

A self-locking link includes two identical link elements which are adapted for connection to two chain links and for mutual engagement with each other. Each link element is generally L-shaped and includes a head portion and a body having an aperture therein. Each body aperture includes an enlarged portion as well as a narrower, elongated portion aligned with a straight line extending between the two chain links to be coupled. The enlarged portion of each aperture is adapted to receive the head portion of the other link element and includes a V-shaped notch therein extending along the aforementioned straight line between the two coupled chain links. Application of a work force along the thus connected link elements of the generally rectangular shaped self-locking link results in the displacement of the head portion of each link element into the elongated portion of the aperture of the other link element. Further application of an increasing work load causes the elongation of each link element's aperture made possible by the slot at one end of the aperture and the inward displacement of the aperture's lateral portions so as to securely engage the head portion of the other link element in a self-locking manner. One end of a hook may be provided in the configuration of a link element for engagement with a second link element in securing the hook to the end of a chain in a self-locking manner.

15 Claims, 12 Drawing Figures

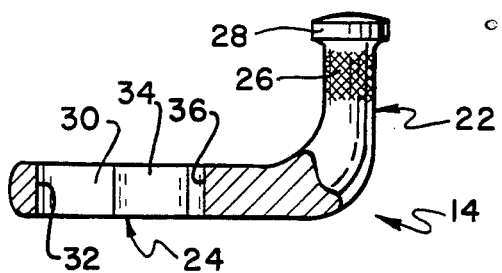
FIG. 1
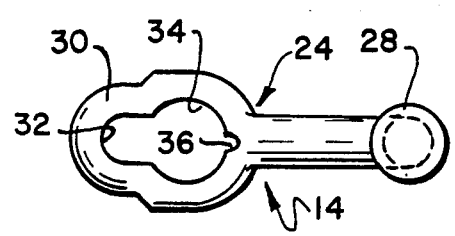
FIG. 2
FIG. 3
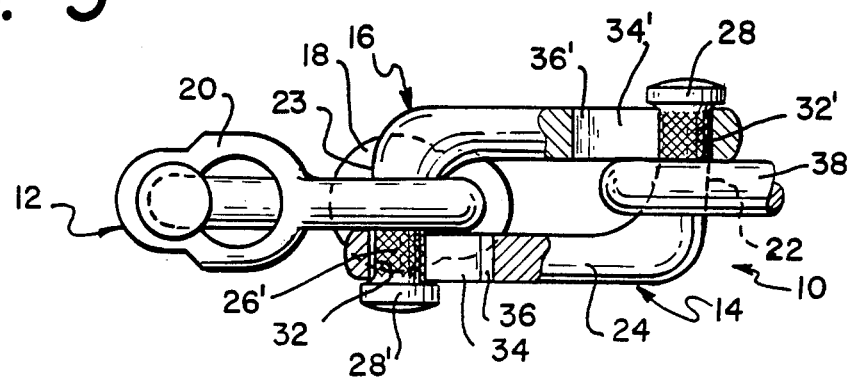
FIG. 4
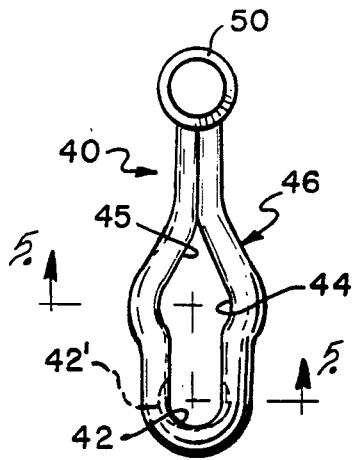
FIG. 5
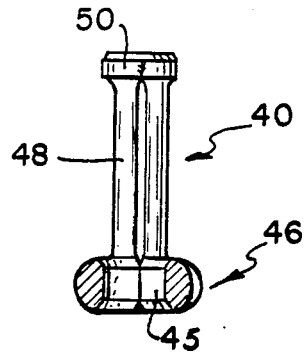
FIG. 6
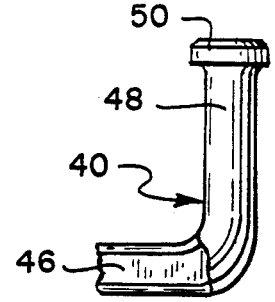
FIG. 7
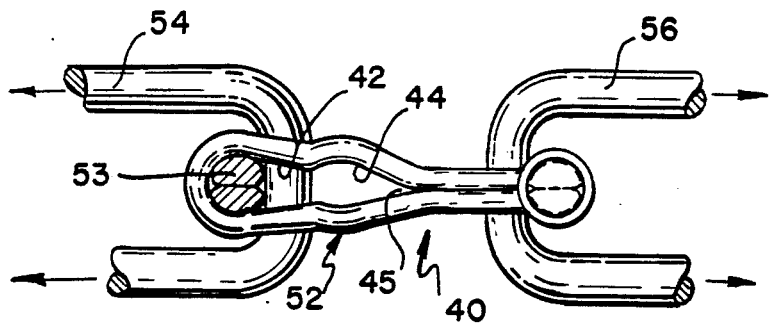

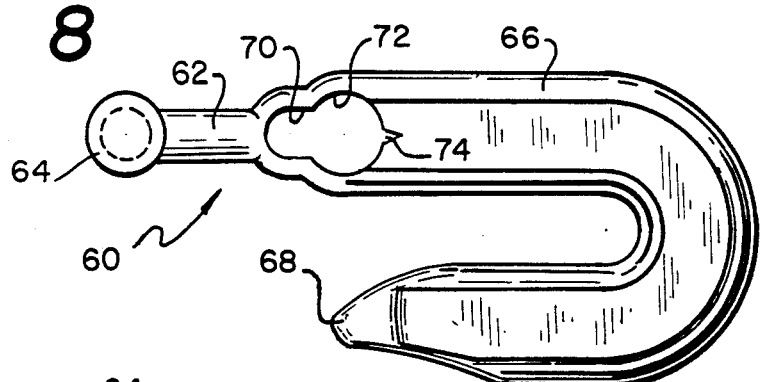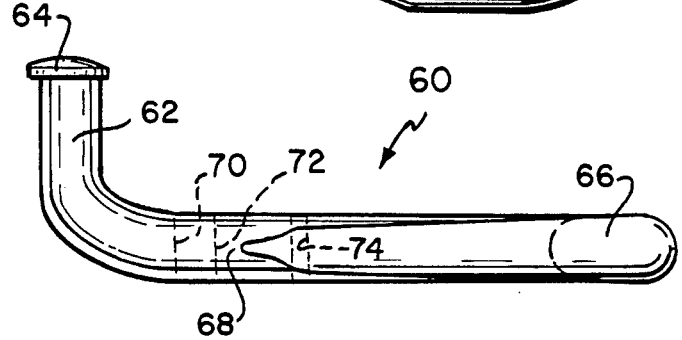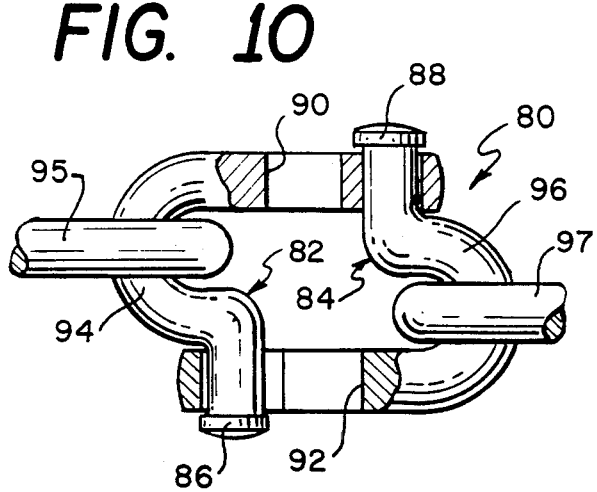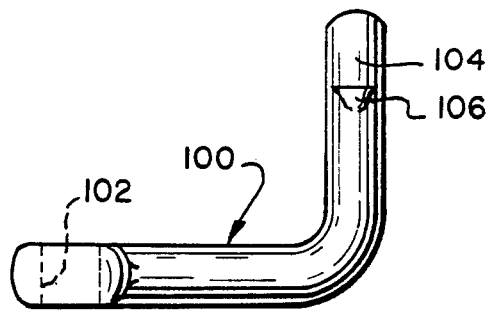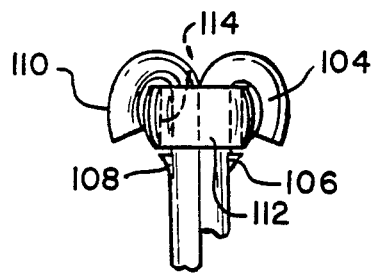

4,635,438

SELF-LOCKING LINK

BACKGROUND OF THE INVENTION

This invention relates generally to mechanical coupling links and is particularly directed to a self-locking link particularly adapted for use in a chain.

As is well known, a chain is comprised of a plurality of individual, coupled links forming an elongated, flexible structure for connecting two objects or for securing one object in a given configuration. Since each link possesses a given strength as determined by its configuration and composition, the chain as a whole similarly possesses a given overall strength. Subjecting the chain to a force which exceeds its rated strength will, of course, result in the deformation fo a chain link, or links, and failure of the chain. It is frequently desirable to repair the thus failed chain by replacing the failed link with a repair link.

The repair link should be easily installed by coupling it to the two links previously connected to the failed link, should remain coupled to the two adjacent links prior to the application of a work load to the chain, and should perform a coupling function in essentially the same manner and to essentially the same degree as the previously failed link. In addition, the replacement link should be integral with the chain and should not become decoupled therefrom. Finally, the replacement link should be inexpensvie, easily fabricated and of high strength.

The present invention represents an improvement over the prior art by providing all of the aforementioned advantages not heretofore available in a single self-locking link which is particularly adapted for use in repairing a chain having a damaged link. The self-locking link of the present invention may be easily installed by hand in coupling two adjacent chain links, or virtually any two objects to be connected, and assumes a locked ocnfiguration therewith upon application of a force of predetermined magnitude across the self-locking link.

OBJECTS OF THE INVENTION

Accordingly, it is an object of the present invention to provdie a coupling link which is self-locking upon application of a work load thereto.

It is another object of the present invention to provide a self-locking chain link which is easily installed and forms a permanent coupling upon application of a stretching force thereto.

Yet another object of the present invention is to provide a self-locking link comprised of a pair of identical link elements which may be installed by hand and forms a permanent connection once installed and deformed by a work load applied thereto.

A further object of the present invention is to provide an easily installed, high strength, inexpensive and self-locking repair link for a chain.

The present invention contemplates a self-locking link comprised of an identical pair of link elements each generally L-shaped and including respective head and body portions. Each body portion includes an aperture therein which includes an expanded portion and a narrower, elongated portion aligned along the direction of application of a work force. The head portion of each link element is adapted for insertion within the expanded portion of the other link element's aperture and for displacement into the narrower, elongated portion of the aperture upon the application fo a work force to the thus coupled link elements. A V-shaped notch also aligned along the direction of application of the work force and extending from the expanded portion of each link element's aperture allows for a narrowing of each aperture along the length thereof upon the application of a load on the link whereupon the head portion of the other link element is securely engaged in a locked manner. The self-locking link of the present invention may thus be manually connected between two chain links, or virtually any two objects, to be coupled and is locked in place by applying a force across the self-locking link sufficient to slightly deform each of the two link elements which are each then configured to securely engage the other link element in a locked arrangement.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is an elevation view of one link element employed in the self-locking link of the present invention;

FIG. 2 is a top view of the link element shown in FIG. 1;

FIG. 3 is a partially cutaway view of two connected self-locking links of the present invention;

FIG. 4 is a top view of a link element in accordance with an alternate embodiment of the self-locking link of the present invention;

FIG. 5 is an end-on view of the link element of FIG. 4;

FIG. 6 is a partial side view of the link element of FIG. 5;

FIG. 7 shows the manner in which the self-locking link of the present invention is deformed to provide secure engagement between its two link elements;

FIG. 8 is a top view of a self-locking hook for use with the self-locking link of the present invention;

FIG. 9 is a side view of the self-lcoking hook shown in FIG. 8;

FIG. 10 shows another embodiment of the self-locking link of the present invention;

FIG. 11 is a side view of a locking link element prior to deformation of one end of the link element and before it is configured in a locked arrangement with another identical link element; and FIG. 12 is a partial end-on view of the link element of FIG. 11 showing the manner in which the head end portion thereof may be shaped so as to securely engage in a locked manner a second link element in forming a locked link in accordance with another embodiment of the present invention.

DETAILED DESCRIPTION OF THE PREFERRED EMBODIMENTS

Referring to FIGS. 1 and 2 there are respectively shown elevation and top views of a link element 14 for use in the self-locking link 10 of the present invention as shown in FIG. 3. In FIG. 3, there is shown a first self-locking link 10 coupled to a second self-locking link 12 in accordance with the principles of the present invention. The first self-locking link 10 is comprised of first and second generally L-shaped coupled link elements 14, 16. Similarly, the second self-locking link 12 is comprised of generally L-shaped first and second coupled link elements 18, 20. All of the individual link elements are identical and are configured and operate as described in detail in the following paragraphs.

The link element 14 is generally L-shaped and includes first and second sections 22, 24 coupled at respective first ends thereof in a generally 90° relative orientation. The first section 22 of the link element includes an intermediate knurled portion 26 having an irregular surface. The distal end portion of the first section 22 of the link element 14 includes an expanded head portion 28. The second section 24 of the link element 14 includes an enlarged, or expanded, portion 30 on the distal end thereof. Located within the enlarged portion 30 of the second section 24 of the link element is a keyhole-shaped aperture which includes an elongated tapered slot portion 32, an enlarged intermediate portion 34 continuous with and located at one end of the tapered slot portion 32, and a V-shaped notch 36 in the enlarged intermediate slot portion 34 of the aperture and extending toward the first section 22 of the link element.

The assembly and operation of the self-locking link 10 of the present invention will now be described with respect to FIG. 3. Typically the self-locking 10 is utilized to connect two adjacent chain links which may have become disconnected by failure of a third link positioned therebetween. One of these chain links is shown as element 38 in FIG. 3 and is engaged by the first link element 14 of the first self-locking link 10. In order to more fully and completely illustrate and described the self-locking link of the present invention, the first self-locking link 10 is shown coupling the chain link 38 to the second self-locking link 12 which includes first and second coupled link elements 18, 20. In some situations it may be desirable to connect two self-locking links of the present invention to one another, as shown in FIG. 3, although in its broadest sense, the present invention has application in coupling virtually any two bodies which may be engaged by a link element of the self-locking link of the present invention.

In assembling the first self-locking link 10, the first link element 14 thereof is positioned so as to engage the chain link 38, while the second link element 16 thereof is positioned so as to engage the second self-locking link 12. In addition, the first section 22 of the first link element 14 is inserted in the enlarged intermediate portion 34' of the aperture in the second link element 16. In this configuration, the head 28 of the first link element 14 extends beyond the second link element 16 with the knurled portion 26 of the first link element positioned within the aperture of the second link element. similarly, the first section 23 of the second link element 16 is inserted within the enlarged intermediate portion 34 of the aperture in the first link element 14. The head 28' of the second link element 16 extends beyond the first link element 14 and the knurled portion 26' of the second link element is positioned within the aperture 18 of the first link element. The first and second link elements 14, 16 are then pulled apart along the direction of the work load to be applied to the self-locking link such that the respective knurled portions 26, 26' of the first and second link elements 14, 16 are positioned within and engage the lateral portions of the elongated tapered slot of the other link element. Thus, the knurled portion 26 of the first link element 14 is maintained in engagment with the elongated tapered slot 32' of the second link element 16, while the knurled portion 26' of the second link element is maintained in engagement with the elongated tapered slot 32 of the first link element. The respective knurled portions of each link element also maintain the link elements in mutual engagement prior to the application of a work load to the self-locking link by engaging the wider end portion of the other link element's tapered slot. The first section of each of the link elements shown in FIG. 3 may be provided with an alternative arrangment other than the aforementioned knurled portion for maintaining each link element in mutual engagement prior to the application of a work load to the self-locking link. For example, each link element's first section may be provided with a teflon or paint coating on its surface so as to form a deformable coating for providing an interference fit between the coupled link elements in maintaining each link element in engagement by the application of manual force prior to the application of the work load to the link element combination.

Upon application fo a work load, or pulling force, across the first link element 14, each of the first and second link elements 14, 16 thereof will be further pulled apart. Upon application of a large enough work load, each of the apertures within the first and second link elements 14, 16 will become elongated and narrower due to the respective V-shaped notches in the proximal portions thereof which allow for its limited deformation. The narrowing of each of the elongated tapered slot portions of the apertures within each of the link elements results in the secure engagement of each link element with the other so as to form a locked coupling link. when thus coupled to and locked between two chain links, the self-locking link of the present invention serves as a standard link within the chain. Regarding the coupled link elements shown in FIG. 3, it should be noted that upon application of a work load to the first self-locking link 10, the chain link 38 as well as the second self-locking link 12 is positioned in tight fitting engagement between the first and second link elements 14, 16 of the first self-locking link. This results in an approximately linear alignment between the second self-locking link 12 and the chain link 38 along the direction of the work load so as to substantially increase the shearing and lineal load forces which the self-locking link of the present invention is capable of accommodating.

Referring to FIG. 4, there is shown a second embodiment of a link element 40 for use in a self-locking link in accordance with the present invention. FIG. 5 shows the link element of FIG. 4 in sectional view taken along sight line 5—5 therein, while FIG. 6 is a partial side view of the link element of FIG. 4. This embodiment of the self-locking link is comprised of a pair of link elements 40 which are identical for configuration. Each of the link elements 40 includes a first seciton, or body, 46 and a second section, or head, 48. The link element 40 is formed of a single, elongated section of one-half round material, preferably comprised of metal, which is shaped in the form of a single piece bent back upon itself as shown in the various figures. The embodiment of the link element 40 of FIG. 4 is thus in the general form of two mirror image sections integral with one another at one end thereof and coupled at the other end thereof as described below. As in the case of the first embodiment of the self-locking link shown in FIGS. 1, 2 and 3, the second embodiment of the link element 40 includes an elongated tapered slot 42, an enlarged proximal end portion 44 of the tapered slot, and a V-shaped end portion 45 of the slot. The distal end of the second section 48 of the link element 40 is formed in the general shape of a disc by welding, a cold heading process, or other conventional forging technique. The head portion 50 of one link element is inserted through the enlarged proximal end portion 44 of the tapered slot 42 in a second, matching link element to form a generally rectangular shaped self-locking link as in the case of the self-locking link embodiment described above.

This embodiment of the self-locking link 52 is shown assembled in FIG. 7 coupling first and second chain links 54, 56. Displacement of the first and second chain links 54, 56 in the direction of the arrows in FIG. 7 upon application fo a work load across the self-locking link 52, results in translational displacement between the link elements of the self-locking link 52. This is shown in FIG. 7 where the head end portion of the second link element 53 has been displaced along the elongated tapered slot 42 in the first link element 40 so as to be securely engaged therein in a locked manner. The work load applied across the self-locking link 52 results in an elongation and narrowing of the tapered slots in each of the first and second link elements 40, 53 which are then coupled in a locked arrangement. From FIG. 7, it can be seen that the aperture within the first link element 40 has become elongated and narrower under the work load applied thereacross by the first and second chain links 54, 56 when compared with the dimensions of the elongated slot in the link element 40 prior to application of a work load thereto as shown in FIG. 4. This second configuration of the self-locking link of the present invention has the advantage of uniform size and strength throughout the entire link structure. In addition, this embodiment permits the link body sides to elongate and to move inwardly to the same degree in locking the two link elements together. Finally, this approach represents a less expensive self-locking link arrangement.

Also shown in dotted line form in FIG. 4 is a generally semi-circular slot 42' which in another embodiment of the self-locking link element 40 replaces the elongated tapered slot 42. In this embodiment of the self-locking link element 40, the second link element to which the self-locking link element 40 is coupled is manually inserted into the semi-circular slot 42' in the link element 40. By proper choice of the dimensions and material of the link elements, this would be accomplished by the application of a force of 40–50 pounds in a preferred embodiment. In this embodiment, each link element would manually be positioned in the fully locked position which would eliminate the need for the interference fit provided by the aforementioned knurled portion of the link element or the deformable surface coating for maintaining the link elements in engagement prior to application of the work load to the self-locking link. Thus, the narrow portion of the semi-circular slot 42, which in a preferred embodiment would extend over an arc of approximately 200°, would maintain the two link elements in locked engagement even prior to the application of the work load to the self-locking link.

Referring to FIGS. 8 and 9, there are respectively shown top and side views of a self-locking hook 60 which makes use of the self-locking link arrangement of the present invention. The self-locking hook 60 includes an L-shaped portion 62, an intermediate, enlarged hook-shaped portion 66, and a tip 68. The combination of the hook-shaped portion 66 and the tip 68 is adapted for coupling a chain (not shown) connected to the L-shaped portion 62 to an object engaged by the hook.

The L-shaped portion 62 includes an enlarged head end 64 on one end thereof and the combination of a tapered slot 70, an enlarged center aperture 72, and a V-shaped notch 74 positioned at the other end of the L-shaped pprtion 62 of the self-locking hook 60. The L-shaped portion 62 of the self-locking hook 60 is adapted for engagement with the link element 14 shown in FIGS. 1 and 2. For example, by inserting the enlarged head end 64 of the self-locking hook 60 into the enlarged intermediate portion 34 of the tapered slot in the link element 14 and inserting the head end 28 of the link element 14 through the enlarged center portion 72 of the hook's tapered slot the combination of the self-locking hook 60 and the link element 14 forms a self-locking link arrangement similar to that shown in FIG. 3 which is adapted for coupling to the link of a chain (not shown). By applying a work load to the combination of the link element 14 and self-locking hook 60, such as that arising from the weight of an object engaged by an suspended from the self-locking hook, the link element and self-locking hook may become securely engaged in a locked manner as previously described in terms of the other embodiments of the self-locking link of the present invention discussed above. As tension is applied to the self-locking hook, the keyhole-shaped aperture therein becomes elongated and narrower along its length so as to securely engage the link element 14 inserted therein.

Referring to FIG. 10, there is shown a third embodiment of a self-locking link 80 in accordance with the principles of the present invention. The self-locking link 80 includes first and second link elements 82, 84. The first and second link elements 82, 84 each include respective head ends 86, 88 and keyhole apertures 90, 92 therein. The first and second link elements 82, 84 respectively engage and couple together first and second chain links 95, 97. The first and second link elements 82, 84 are coupled together in a manner similar to that described with respect to the other embodiments of the present invention discussed above. For example, the head end 86 of the first link element 82 is inserted through the keyhole aperture 92 of the second link element 84. Similarly, the head end 88 of the second link element 84 is inserted through the keyhole aperture 90 of the first link element. When a work load is applied between the first and second chain links 95, 97, the self-locking link 80 is subjected to a stretching force causing the respective head end portions of the first and second link elements 82, 84 to be displaced along a respective keyhole aperture of the other link element. With each keyhole aperture including a tapered end portion therein, each of the link elements becomes securely engaged in a locked manner with the other link element upon the application of a work load to the self-locking link 80 so as to cause an elongation and narrowing of the keyhole aperture of each of the link elements whereby the other link element is securely engaged.

The embodiment of the present invention shown in FIG. 10 affords increased pivoting freedom for the respective chain links coupled thereto than that provided for in the earlier discussed embodiments. However, the self-locking link configuration of FIG. 10 results in a misalignment of the first and second chain links 95, 97 coupled by the self-locking link 80 resulting in a somewhat transverse application of the work load applied across the self-locking link.

Referring to FIGS. 11 and 12, there is shown yet another arrangement of a link element 100 in accordance with the principles of the present invention. The L-shaped link element 100 is provided with an aperture 102 adjacent to one end thereof. The link element 100 is similar to those link elements shown in FIGS. 4–6 in that it is comprised of a single, elongated one-half round section folded back upon itself in a generally L-shaped configuration. The link element 100 may thus be thought of as comprised of first and second link element sections 104 and 110 which are aligned generally parallel to one another except where coupled together adjacent ot the aperture 102 in the link element. Each of the first and second link element sections 104, 110 is provided with a respective lateral projection 106, 108 extending therefrom adjacent to an end portion thererof. The end portions of each of the first and second link element sections 104, 110 is inserted through an aperture 114 in a second link element 112. The respective ends of the first and second link element sections 104, 110 are then bent around the second link element 112 in a conventional manner as shown in FIG. 12. With each of the end portions of the first and second link element sections 104, 110 thus tightly wrapped around a portion of the second link element 112, the locking link possesses a generally smooth outer surface and a generally more attractive appearance. In addition, lateral movement between the link elements in the locking link is prevented by the combination of the bent end portions of the first and second link element sections 104, 110 and the lateral projections 106, 108 extending therefrom between which the second link element 112 is positioned and confined. This arrangement provides increased coupling between the two link elements in the locking link and eliminates the need for the aforementioned knurled portion of the link element.

There has thus been shown a self-locking link comprised of two identical link elements which are particularly adapted for coupling two chain links. The self-locking link is easily connected, requires no tools for installation, is inexpensive, and provides secure, permanent coupling between adjacent chain links. In a typical application of the self-locking link of the present invention, the two link elements may be placed in loose engagement with each other by positioning the knurled portion of one link element within the tapered portion of the aperture of the other link element. This loose engagement may be accomplished by applying on the order of 40–50 pounds of force to the assembled link. When the full force of the work load is applied, e.g., 3,000–4,000 pounds, the link elements are pulled into locked engagement so as to form a permanent repair link. It is important to select the proper material for the composition of the link elements as well as provide the proper dimensions around the aperture within the link element to ensure its proper deformation. Both of these parameters relate to the desired strength of the self-locking link and are within the scope of one skilled in the art to determine.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

The matter set forth in the foregoing description and accompanying drawings is offered by way of illustration only and not as a limitation. The actual scope of the invention is intended to be defined in the following claims when viewed in their proper perspective based on the prior art.

I claim:

1. A self-locking link comprising first and second generally L-shaped link elements each including first and second elongated sections oriented generally transversely to each other, wherein each of said second sections includes a deformable portion having an aperture including an intermediate portion and tapered at a first end along the length and toward the distal end of said second section and having a notch in a second facing end thereof to facilitate a narrowing and elongation of the tapered aperture upon application of a work load generally parallel to the second sections of the link elements, and wherein each of said first section is dimensioned so as to loosely engage the intermediate portion of said tapered aperture prior to application of a work load generally parallel to the second sections of the link elements and includes an enlarged portion on the distal end thereof adapted for insertion in said aperture and through the second section of the other link element and wherein the first section of each of the link elements is securely engaged along a respetive intermediate portion thereof by the tapered aperture of the other link element upon the application of a work load across said self-locking link in a direction generally parallel to the second sections of the link elements by the elongation of the tapered aperture of the other link element along the length thereof and resulting narrowing of the aperture.

2. A self-locking link in accordance with claim 1 wherein the aperture in each of said first and second link elements further includes an enlarged portion disposed between the intermediate portion of the tapered aperture and the notch in the second facing end thereof for receiving the enlarged distal end portion of the first section of the other link element.

3. A self-locking link in accordance with claim 1 further comprising first and second links of a chain, wherein the first and second link elements are respectively inserted through said first and second chain links for the coupling thereof.

4. A self-locking link in accordance with claim 3 wherein said first and second links of the chain are aligned in a generally linear arrangement along the direction of the applied work load.

5. A self-locking link in accordance with claim 1 wherein each of the respective intermediate portions of the first sections of the first and second link elements includes a knurled portion for engaging the intermediate portion of the other link element's aperture for maintaining the first and second link elements in loose engagement prior to the application of a work load across said self-locking link whereupon said link elements become securely engaged to each other.

6. A self-locking link in accordance with claim 1 wherein the enlarged distal end portion of the first section of each of said link elements is generally disc-shaped and is adapted for insertion through the aperture of the other link element and wherein each of the apertures of said first and second link elements includes a respective pair of spaced, opposed, parallel surfaces defining the intermediate portion thereof and wherein the intermediate portion of the first section of each of said link element is coupled to the parallel surfaces of the other link element prior to the applicaion of a work load across said self-locking link.

7. A self-locking link in accordance with claim 1 wherein each of said link elements is comprised of an elongated one-half round member folded back upon itself at the distal end of the second section thereof so as to form first and second link element halves, with said first and second link element halves displaced from one another so as to form the aperture in said second link section and in intimate contact with each other along the remaining portions of the respective lengths thereof.

8. A self-locking link comprising first and second generally L-shaped link elements each including first and second elongated sections oriented generally transversely to each other, wherein each of said second sections includes a deformable portion having an aperture tapered at a first end along the length and toward the distal end of said second section and having a notch in a second facing end thereof, and each of said first sections includes an enlarged portion on the distal end thereof adapted for insertion in said aperture and through the second section of the other link element and wherein the first section of each of the link elements is securely engaged along an intermediate portion thereof by the tapered aperture of the other link element upon the application of a work load across said self-locking link in a direction generally parallel to the second sections of the link elements, wherein each of said link elements is comprised of an elongated one-half round member folded back upon itself at the distal end of the second section thereof and wherein the ends of the elongated one-half round member are bent away from one another and over the second section of the other link element to provide increased coupling between the first and second link elements.

9. A self-locking link in accordance with claim 8 wherein the intermediate portions of each of the first sections of the first and second link elements include projections thereon, with the second section of one link element positioned in tight fitting relation between said projections and the bent ends of the first section of the other link element to provide increased coupling between the first and second link elements.

10. A self-locking link in accordance with claim 7 wherein said tapered aperture includes a generally semi-circular portion having an open end oriented toward the proximal end of the second section of the link element for engaging and retaining the first section of the other link element prior to application of a work load across said self-locking link.

11. A self-locking link in accordance with claim 1 further including grasping means coupled to one of said link elements adjacent to the distal end of its second section for engaging an object.

12. A self-locking link in accordance with claim 11 wherein said grasping means is a hook coupled at one end thereof to the distal end of the second section of said link element.

13. A self-locking link comprising first and second generally L-shaped link elements each including first and second elongated sections oriented generally transversely to each other, wherein each of said second sections includes a deformable portion having an aperture tapered at a first end along the length and toward the distal end of said second section and having a notch in a second facing end thereof, and each of said first sections includes an enlarged portion on the distal end thereof adapted for insertion in said aperture and through the second section of the ohter link element and wherein the first section of each of the link elements is securely engaged along an intermediate portion thereof by the tapered aperture of the other link element upon the application of a work load across said self-locking link in a direction generally parallel to the second sections of the link elements, and wherein each of the first sections of the first and second link elements is provided with a deformable coating on the surface thereof for engaging the tapered portion of the other link element's aperture for maintaining the first and second link elements in loose engagement prior to application of a work load across said self-locking link whereupon said link elements become securely engaged to each other.

14. A self-locking link in accordance with claim 13 wherein said deformable coating is comprised of teflon.

15. A self-locking link in accordance with claim 13 wherein said deformable coating is comprised of paint.

* * * * *

UNITED STATES PATENT AND TRADEMARK OFFICE
CERTIFICATE OF CORRECTION

PATENT NO. : 4,635,438
DATED : January 13, 1987
INVENTOR(S) : Robert B. Rottinghaus It is certified that error appears in the above—identified patent and that said Letters Patent is hereby corrected as shown below:

Column 2, line 1, "fo" should be -- of --.

Column 3, lines 54 and 55, "similarly" should be -- Similarly --.

Column 4, line 22, "fo" should be -- of --;

line 34, "when" should be -- When --;

line 56, "identical for" should be -- identical in --;

line 57, "seciton" should be -- section --.

Column 5, line 16, "fo" should be -- of --.

Column 8, line 19, "section" should be -- sections --.

Column 9, line 1, "element" should be "elements --;

line 2, "applicaion" should be -- application --.

Column 10, line 26, "ohter" should be -- other --.

Signed and Sealed this

Twenty-first Day of April, 1987

Attest:

DONALD J. QUIGG

Attesting Officer      Commissioner of Patents and Trademarks